F. B. BRADLEY.
SWITCH ROD.
APPLICATION FILED NOV. 28, 1914.
1,187,130.
Patented June 13, 1916.
5 SHEETS—SHEET 1.
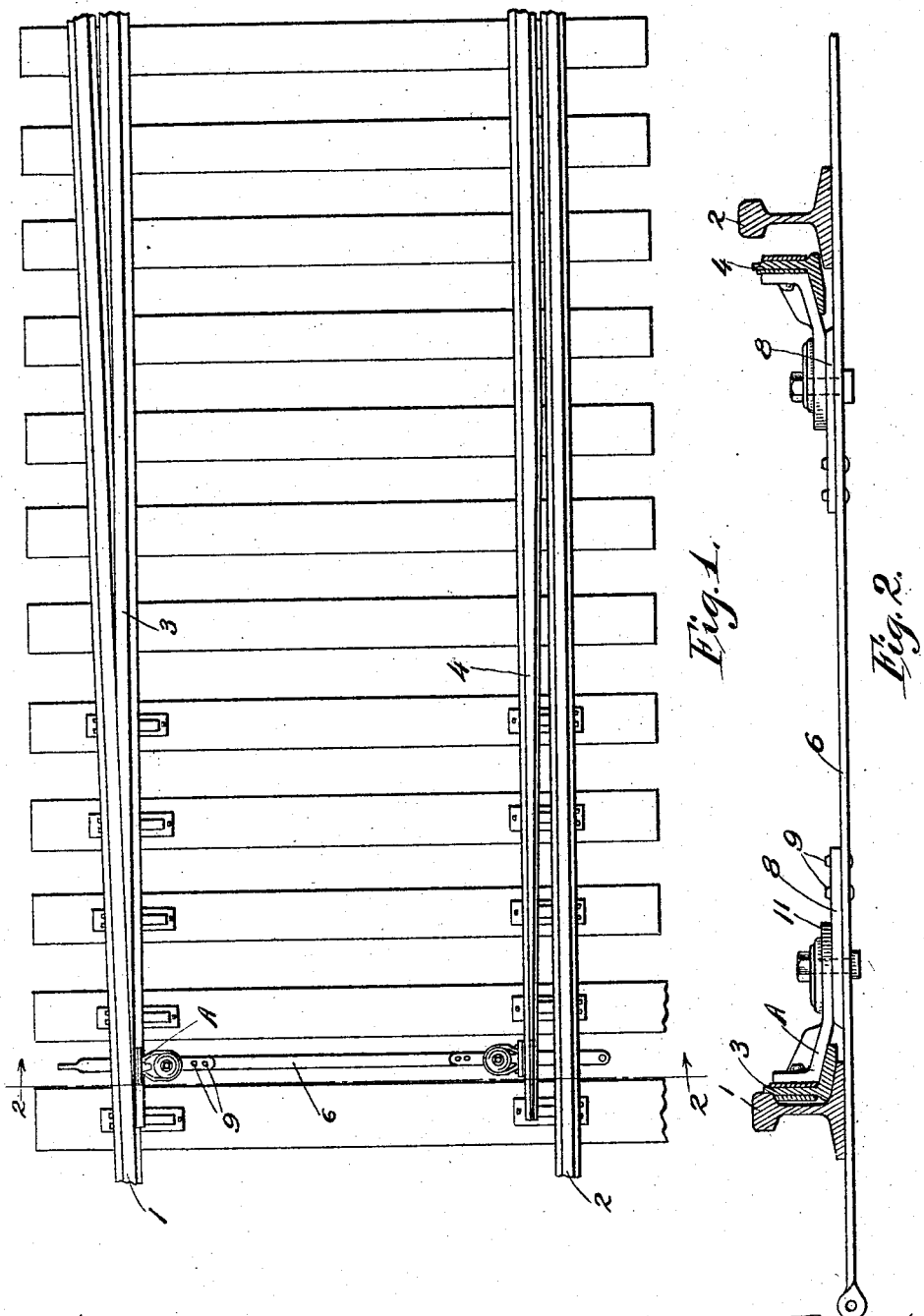
Witnesses:
Inventor:
Frank B. Bradley
By Sheridan, Wilkinson & Scott Attorneys

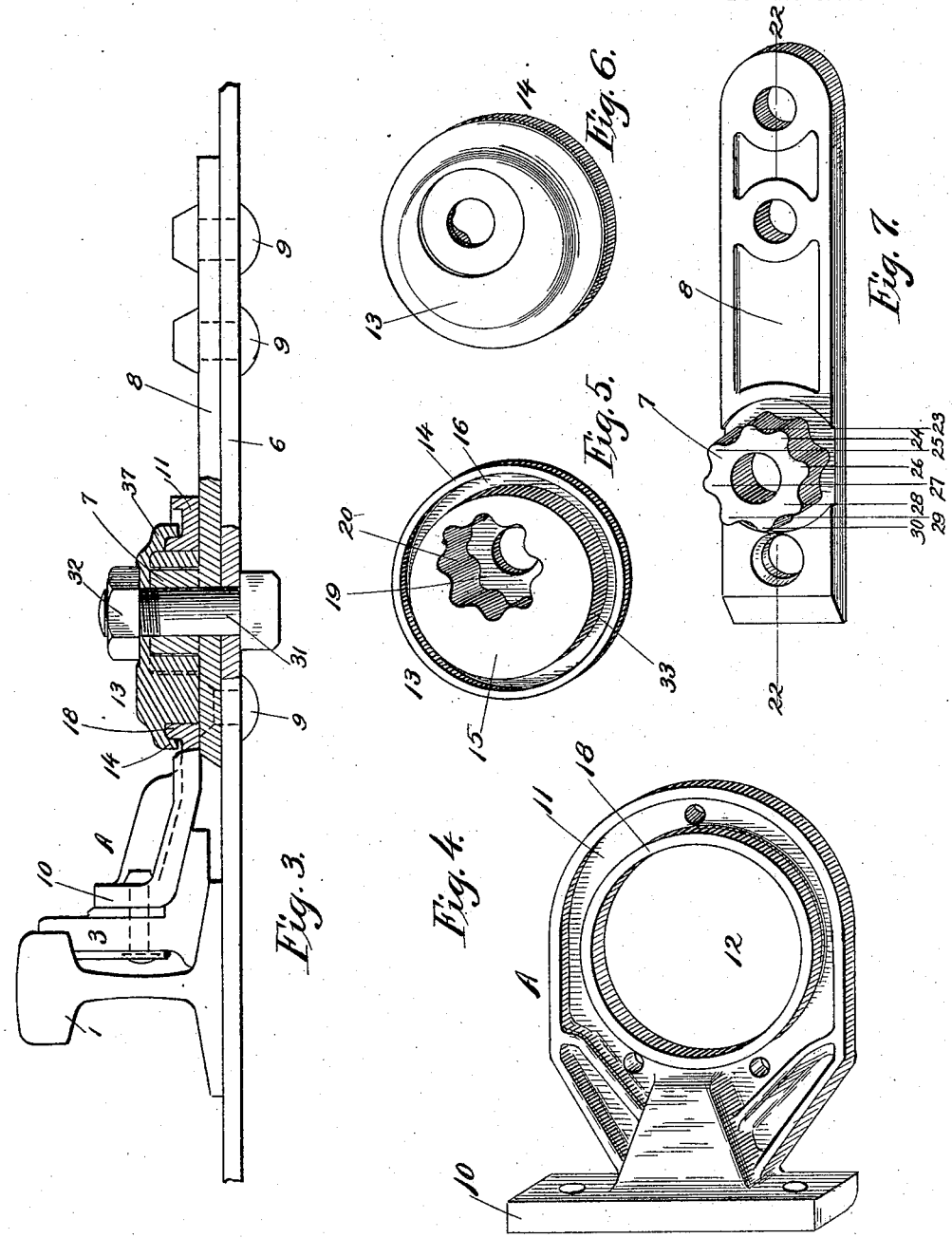

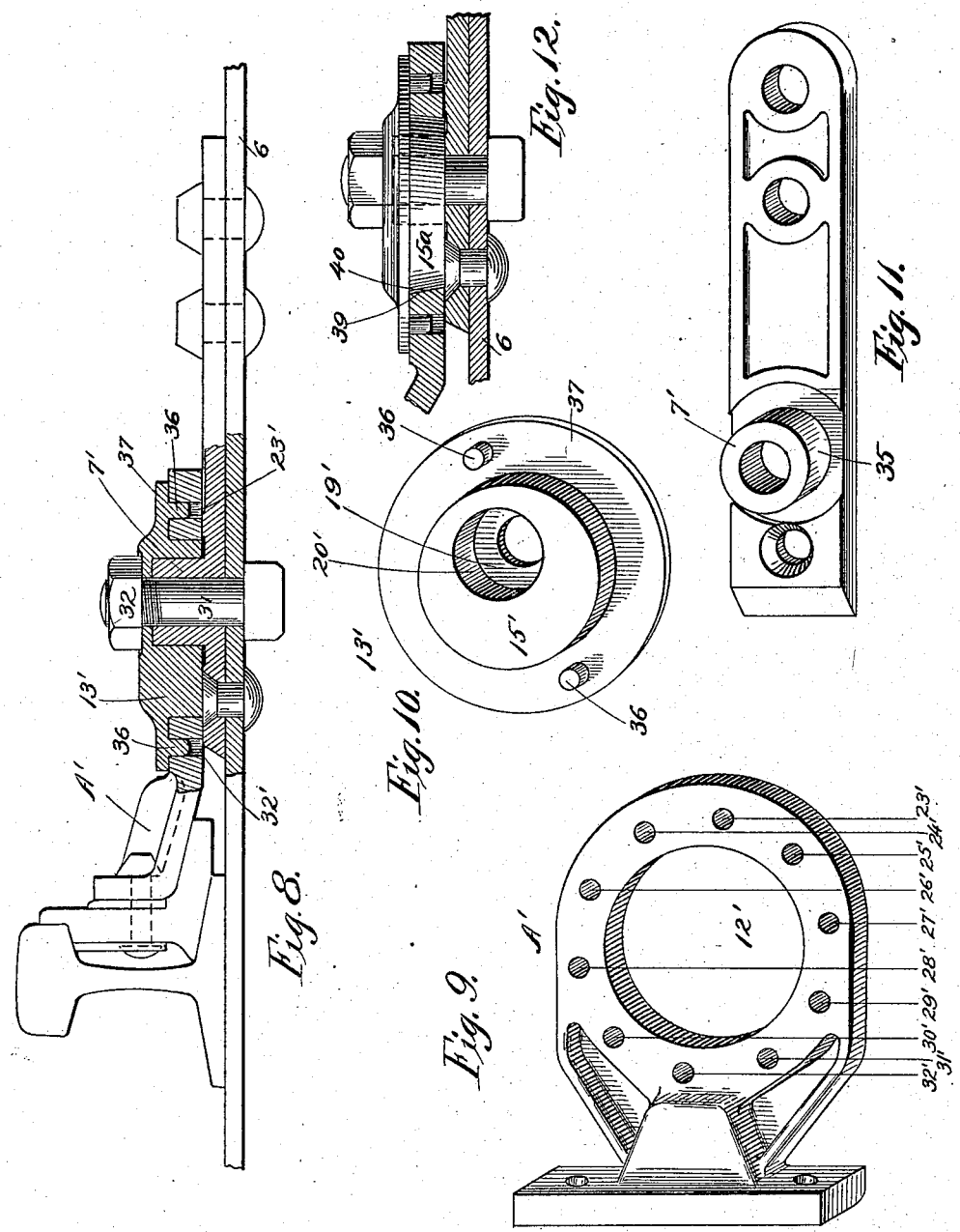

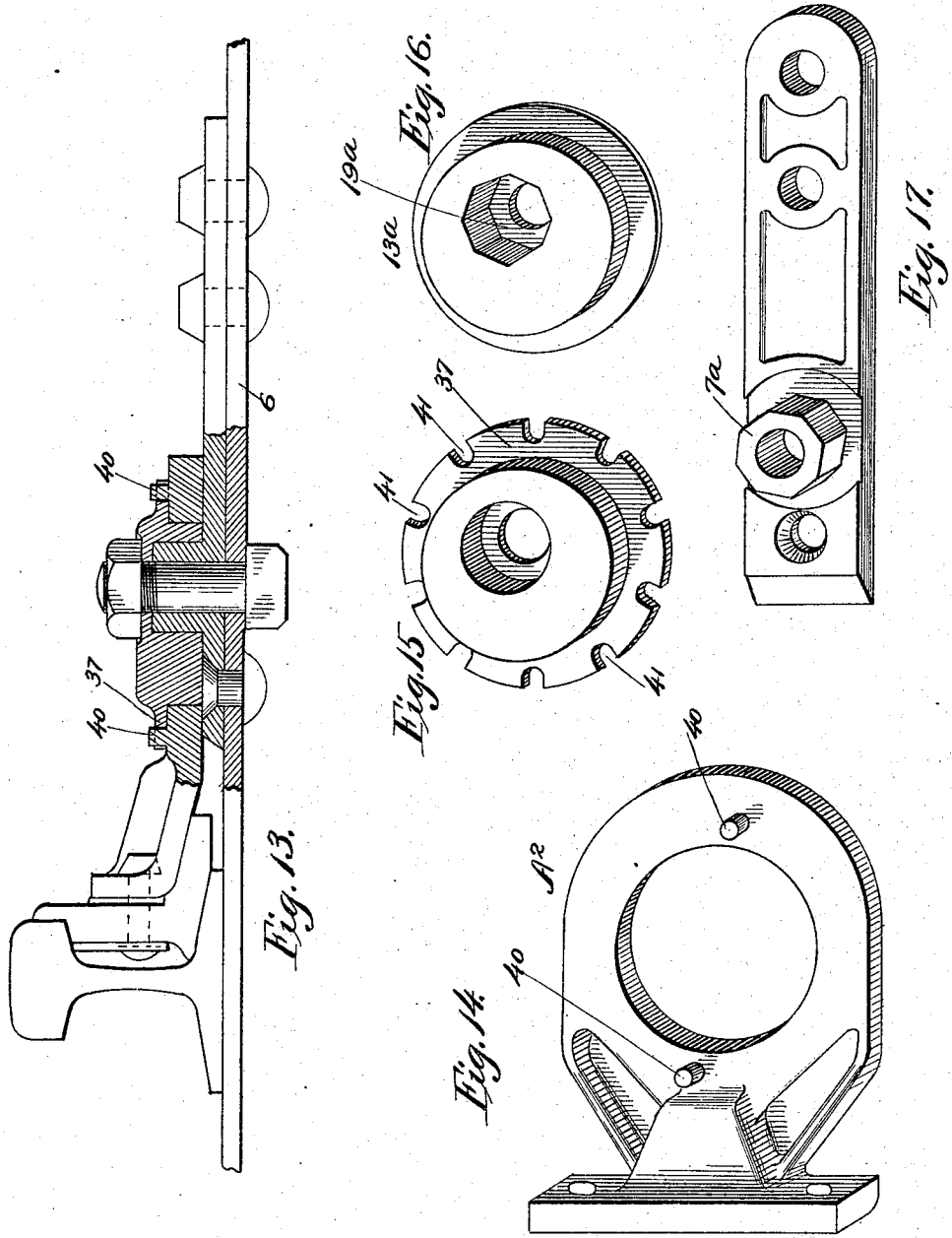

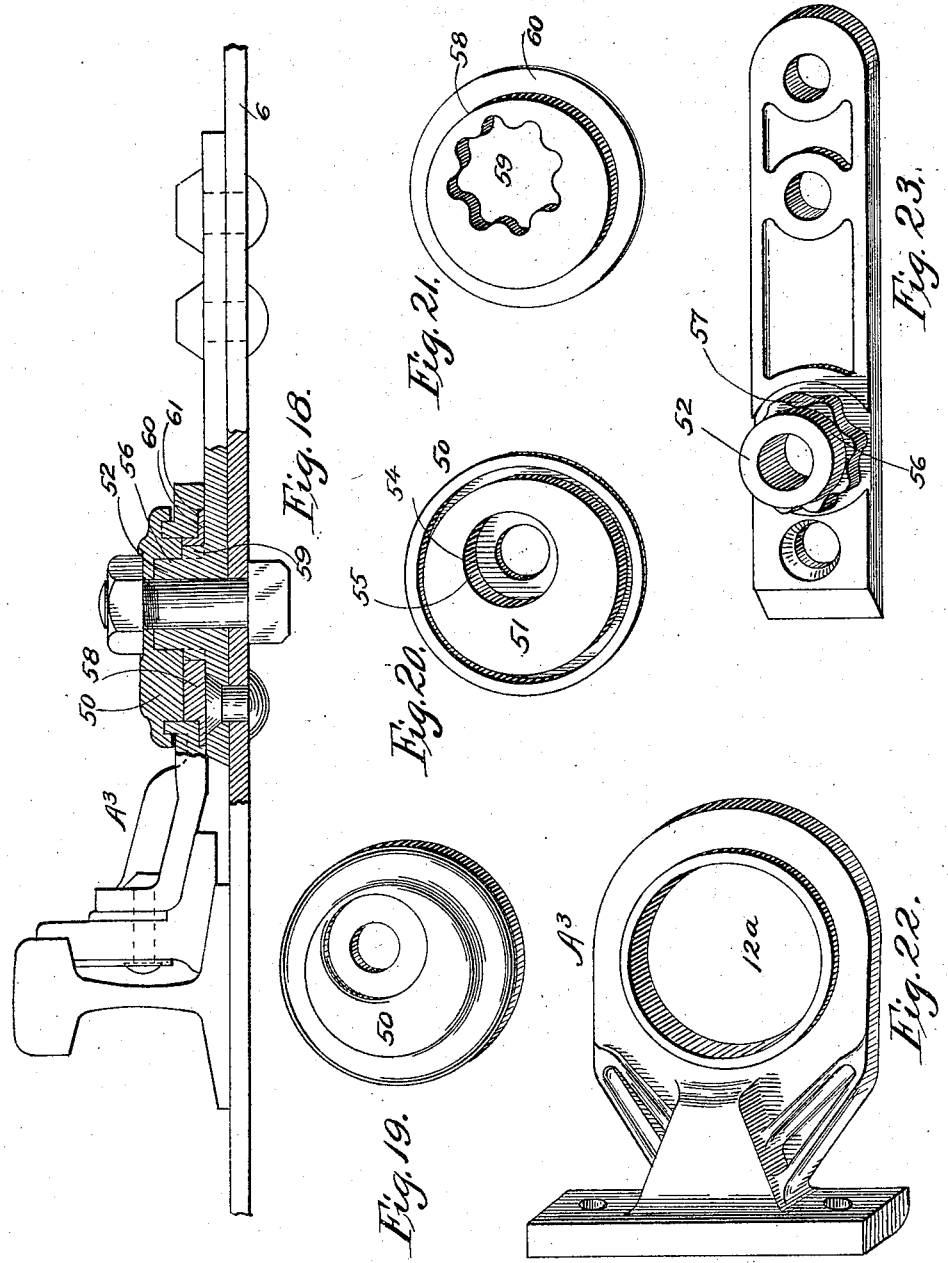

UNITED STATES PATENT OFFICE.

FRANK B. BRADLEY, OF CHICAGO, ILLINOIS, ASSIGNOR TO AJAX FORGE COMPANY, A CORPORATION OF DELAWARE.

SWITCH-ROD.

1,187,130.

Specification of Letters Patent.

Patented June 13, 1916.

Application filed November 28, 1914. Serial No. 874,436.

*To all whom it may concern:*

Be it known that I, FRANK B. BRADLEY, a citizen of the United States, residing at Chicago, in the county of Cook and State of Illinois, have invented certain new and useful Improvements in Switch-Rods, of which the following is a specification.

My invention is an improved adjustable switch rod.

In the drawings, Figure 1 is a plan view of a switch with my invention applied thereto. Fig. 2 is a sectional view on the line 2—2 of Fig. 1. Fig. 3 is an elevation view partly in section, showing part of a switch rod, the traffic rail, the switch point, the grip or switch point clip to which the switch point is attached and the adjustable connection between the clip and the switch rod. Fig. 4 is a perspective view from above of the grip forming part of the structure illustrated in Fig. 3. Fig. 5 is a perspective view from below of the adjustment member through which an adjustable connection is established between the clip and switch rod. Fig. 6 is a perspective view from above of the adjustment member. Fig. 7 is a perspective view from above of a member which is attached to and forms part of the switch rod, carrying the adjustment element which coacts with the adjustment member illustrated in Figs. 5 and 6. Fig. 8 is a view similar to Fig. 3 showing a modification of the device as illustrated in Figs. 1 to 7. Figs. 9—10 and 11 are views similar to Figs. 4—5 and 7, showing the modified structure. Fig. 12 is a fragmentary sectional view showing another modification of the structure in which the adjustment members of the coacting part have a tapering fit. Figs. 13—14 and 15 are views similar to Figs. 3—4 and 5, showing a still further modification. Figs. 16 and 17 are views similar to Figs. 5 and 7 showing another modification. Fig. 18 is a view similar to Fig. 3 showing a still further modification. Fig. 19 is a perspective view from above of the upper part of the adjustment member, which in this modification is divided into two parts on a horizontal plane. Fig. 20 is a perspective view from below of the upper part of the adjustment member. Fig. 21 is a perspective view from above of the lower part of the adjustment member. Fig. 22 is a perspective view from above of the clip, and Fig. 23 is a perspective view similar to Fig. 7 showing a member to be attached to the switch rod and forming part thereof, which member carries a part which coacts with the adjustment member.

Referring to the form of my invention shown in Figs. 1 to 7, I have illustrated in Fig. 1 an ordinary form of point switch, including the two continuous rails 1 and 2, and the point rails 3 and 4. The point rail, as usual, is secured to a clip A, which in turn is secured through intermediate means to the switch rod 6. Formed upon or rigid with the switch rod 6 is an upwardly extending stud 7, illustrated as formed upon a supplemental bar or plate 8 which is rigidly attached to the switch rod by means of rivets 9. The clip designated generally by the letter A carries a flange 10, at which point the clip is attached to the point rail by rivets or otherwise. Extending substantially horizontally from the flange 10 is the base member 11 of the clip which is provided with a circular opening 12, which is considerably larger than the upwardly extending stud 7 upon the plate 8 and is adapted to surround the same leaving the intermediate space to be occupied by part of the adjustment member. The upwardly projecting stud 7 has a non-circular periphery, and in the form of my device under consideration this peripheral surface is corrugated or fluted. An adjustment member 13 is circular in form and around its outer periphery is provided with a downwardly projecting flange 14, and at its central part with a downwardly projecting part 15 between which and the flange 14 there is an annular channel 16 designed to fit over an upwardly projecting lip 18 which surrounds the opening 12 in the clip. Extending upwardly from the under-surface of the part 15 of the adjustment member 13 is a socket 19, of the same size and form as the upwardly projecting stud 7; the outer periphery 20 of the socket or seat 19 being corrugated in the same manner as the outer periphery of the stud 7.

The socket 19 is eccentrically located with respect to the circular part 15 of the adjustment member 13, which circular part is designed in assemblage to fit the opening 12 of the clip A. A bolt hole is formed in the adjustment member 13, the same being located centrally with respect to the socket 19, and a continuation of this bolt hole extends centrally through the stud 7 and is continued through the base plate 8 and switch rod 6. In assemblage the clip A, to which the switch point is attached, is placed in position with the opening 12 therein surrounding the stud 7, and the adjustment member 13 is then placed in position as illustrated in Fig. 3 with its projection 15 fitting within the opening 12 and its socket 19 fitting around the stud 7.

By reason of the eccentric location of the socket 19 with respect to the outer circular periphery of the part 15, an adjustment of the position of the switch point relative to the body of the switch rod and relative to the fixed rail 1 can be obtained by adjusting the adjustment member 13 to different angular positions, eight of such different angular positions being possible with the corrugated stud and socket illustrated. Eight adjustments are possible by reason of the fact that the corrugations upon the stud 7 are not symmetrically disposed with reference to the axis 22—22 of the switch rod, as shown in Fig. 7, and likewise the corrugations around the periphery of the socket 19 and the adjustment member 13 are not symmetrically arranged with reference to a line joining the center of the projection 15 with the center of the socket 19. The arrangement of the corrugations is clearly indicated in Fig. 7 by the lines 23 to 30, inclusive, which lines lead to the several corrugations upon the stud 7. Assuming that the eccentric adjustment member 13 is adjusted to give the grip its extreme throw to the right, as viewed in Figs. 3 and 7, it will be apparent that an angular adjustment of the eccentric equal to one corrugation in clockwise direction will move the clip to the left a certain distance; that if the eccentric be given an angular adjustment from the corrugation 23 to another corrugation 25, the clip will be moved a greater distance corresponding to the increased throw of the eccentric. Thus by giving alternate angular adjustments in a clockwise and counter-clockwise direction the clip may be moved successively through distances corresponding to the throw of the eccentric when the latter is adjusted from one to the other of the corrugations 23 to 30, thereby securing twice as many adjustments as would be the case if the corrugations were symmetrically arranged with regard to the axis 22.

To facilitate adjustment, the stud 7 is of sufficient height to extend above the upper surface of the horizontal part of the clip A, that is above the upper surface of the annular rib 18 which surrounds the opening 12. By having the stud 7 so project above the clip A, the adjustment member is easily applied by first engaging its socket 19 with the stud 7, after which the body of the projection 15 upon the adjustment member may easily be fitted within the opening 12 in the clip. After the parts are so fitted together, the bolt 31 is placed in position and the parts secured permanently together by means of the nut 32. Whenever the switch point does not properly coact with the adjacent rail, the proper adjustment can easily be made in the manner above described by simply removing the nut 32, lifting the adjustment member 13 out of engagement with the stud 7, turning the adjustment member sufficiently to cause the eccentric surface 33 surrounding the projection 15 to properly position the clip through engagement with the opening 12 therein, then replacing the adjustment member 13 over the stud 7 and within the opening 12, whereupon the parts are secured together as before by means of the nut and bolt 32—31.

It will be observed that my invention is not confined to the particular means above described for securing the eccentric adjustment member 13 in the desired adjusted position. In the form of my device illustrated in Figs. 1 to 7 the eccentric adjusting member 13 is secured in its adjusting position against rotation by the interengagement of the corrugated surfaces of the socket 19 and stud 7. In Figs. 8 to 11 I have illustrated a modification in which the adjustment member is held in adjusted position by other means. In this form of my invention the adjustment member 13' and the stud 7' are similar in general form to those parts as illustrated in Figs. 1 to 7, inclusive, but in the modified form the stud 7' is formed with a cylindrical periphery 35 and the socket 19' in the projection 15' has a similar cylindrical periphery 20'. The adjustment member 13' coacts with the clip A', as described in connection with the form illustrated in Figs. 1 to 7. The means for securing the adjusting member 13' in its several angular adjustments comprise dowels 36 extending downwardly from the flange 37 of the adjustment member, and a series of cylindrical recesses 23' to 32' extending downwardly into the upper part of the clip A' around the opening 12' therein, these recesses being located equidistant and being non-symmetrically disposed as explained in connection with the corrugations on the stud 7, as illustrated in Fig. 7.

It will be apparent from the foregoing explanation of the form of the device illustrated in Figs. 1 to 7, that the clip may in the form of the device illustrated in Figs. 8 to 11 be adjusted to ten different positions, and may be held in each of these positions by engagement of the studs 36 upon the adjustment member 13' with the recesses 23' to 32' in the clip A'. In this form of the device, as in the other forms herein illustrated and described, the outwardly extending flange 37 of the adjustment member overlies the upper surface of the clip thereby serving to hold all parts in assembled position by means of the nut and bolt 32—31.

In Fig. 12 I have shown a fragmentary sectional view of a form of the device similar to that illustrated in Figs. 8 to 11, except for the fact that the coacting surfaces 39 and 40 around the periphery of the projection 15ª of the adjustment member and the periphery of the opening in the clip are tapered or conical and converge downwardly, thereby facilitating easy assemblage and adjustment of the device. This tapered or conical form of the coacting surfaces of the adjustment member and clip may be used in connection with any of the modifications of my invention herein described.

In Figs. 13—14 and 15 I have illustrated another modification of my device similar to the modification illustrated in Figs. 8 to 11, except for the fact that dowels 40 project upwardly from the clip A² and are designed to engage recesses 41 around the periphery of the flange 37 of the adjustment member, thereby holding the parts in their several adjusted positions. Otherwise this modification of the device is in principle and operation like those previously described.

In Figs. 16 and 17 I have illustrated a still further modification of the device in which the stud 7ª is formed with an octagonal outer periphery, and the socket 19ª in the adjustment member 13ª is likewise octagonal in form, the octagonal form of these parts serving to hold the members in their several adjusted positions in the same manner as the corrugations illustrated in Figs. 1 to 7. It will be apparent that by non-symmetrical arrangement of the octagonal surfaces shown in Figs. 16 and 17 and by corresponding arrangement of the studs 40—40 and the recesses 41 shown in Figs. 13 to 15, a maximum number of adjustments may be obtained as described in connection with the non-symmetrical arrangement of the corrugations shown in Figs. 1 to 7 and of the recesses which are engaged by the dowels 36 in the forms of the device illustrated in Figs. 8 to 12.

In Figs. 18 to 23, inclusive, I have illustrated a still further modification of my invention, in which the adjustment member is constructed in two parts separated from one another on a horizontal plane and in which form of the device I have also shown the corrugations or other non-circular elements of the stud extending through only a part of the height of the same. The adjustment member in this form of the device consists of an upper part 50, the central downward projection 51 of which extends downwardly only to a point about midway the height of the stud 52, and otherwise the upper part of the adjustment member in this form of the device is similar in form to the upper part of the one-piece adjustment member shown in Figs. 1 to 7, with the exception of the fact that the socket 54 in said upper part is provided with a cylindrical periphery 55 designed to engage the cylindrical upper part 56 of the stud 52. The stud 52 in this form of the device has a corrugated form 57 extending from the bottom to a point about half way to the top thereof, at which point it takes a cylindrical form as shown at 56. The lower part 58 of the adjustment member in this form of the device is provided with an eccentrically located corrugated seat or socket 59 designed to fit over the lower corrugated part of the stud 52, and the lower part 58 is also provided with an outwardly extending flange 60 at its lower surface, said flange 60 being designed to be countersunk in an annular recess 61 formed in the lower surface of the clip A³ around the opening 12ª therein. In other respects this form of the device is similar to that shown in Figs. 1 to 7. In assemblage the lower part 58 of the adjustment member is placed over the stud 52, with its corrugated socket 59 in engagement with the lower corrugated part of the stud 52. The clip A³ is then placed in position with its annular recess 61 fitting over the flange 60 on the lower part of the adjustment member, whereupon the upper part of the adjustment member is placed in position and the parts secured together by the nut and bolt, as in the forms of the device previously described. It will be apparent that the two-part feature of the adjustment member may be employed in connection with any of the other modified features herein described.

While I have described several specific embodiments of my device, it will be apparent that various other modifications may be introduced, all embodying the principle of my invention, which is defined in the following claims.

I claim:

1. In a device of the class described, a switch rod, a stud projecting from said rod, an adjustment member having an eccentric seat adapted to engage said stud, means for preventing rotation of said adjustment member, and a clip engaging said adjustment member.

2. In a device of the class described, a switch rod, a stud projecting from said rod, an adjustment member having an eccentric seat adapted to engage said stud, a clip engaging said adjustment member, and coacting means between said adjustment member and one of said other parts for preventing rotation of said adjustment member.

3. In a device of the class described, a switch rod, a plate secured to said rod, an upwardly projecting stud on said plate, an adjustment member having an eccentric seat adapted to engage said stud in a plurality of angularly different positions, means for preventing rotation of said adjustment member, a clip engaging said adjustment member, and a bolt holding said adjustment member and clip in place on said switch rod.

4. In a device of the class described, a switch rod, a stud projecting therefrom having a non-circular periphery, an adjustment member having an eccentric seat adapted to non-rotatively engage said stud in a plurality of angularly different positions, and a clip engaging said adjustment member.

5. In a device of the class described, a switch rod, a stud projecting therefrom, an adjustment member having an eccentric seat adapted to engage said stud, a clip engaging said adjustment member, and a flange on said adjustment member overhanging said clip.

6. In a device of the class described, a switch rod, a stud projecting therefrom, an adjustment member having an eccentric seat in its under side adapted to fit over said stud and to be angularly adjustable thereon, a clip engaging the periphery of said adjustment member, a flange on said adjustment member overhanging said clip, and a bolt passing through said adjustment member, stud and switch rod.

7. In a device of the class described, a switch rod, a stud projecting therefrom, said stud having a corrugated periphery, an adjustment member having an eccentric seat adapted to fit over said stud and to engage the corrugations thereon, a clip embracing the exterior of said adjustment member, said adjustment member having a flange overlying said clip and a bolt passing centrally through said stud and holding said parts in fixed relation.

8. In a device of the class described, a switch rod, a stud projecting from said rod, a clip having an opening larger than and surrounding said stud, said stud extending upwardly above the upper surface of said clip, an adjustment member seated in the space between said stud and the surrounding wall of said opening in said clip, and having an eccentric aperture engaging said stud.

9. In a device of the class described, a switch rod, a stud projecting from said rod, an adjustment member having a seat adapted to engage said stud, and a switch point clip engaging said adjustment member.

10. In a device of the class described, a switch rod, a stud projecting from said rod, a member having a seat adapted to engage said stud, a switch point clip engaging said member, and a bolt to hold said elements in assembled relation.

11. In a device of the class described, a switch rod, a stud projecting from said rod, a member having a seat adapted to engage said stud, a switch point clip engaging said member, means to prevent rotation of said member, and a bolt to hold said elements in assembled relation.

12. In a device of the class described, a switch rod, a stud projecting therefrom having a non-circular periphery, an adjustment member having a seat adapted to non-rotatively engage said stud in a plurality of angularly different positions, a switch point clip engaging said adjustment member, and means to hold said parts in assembled relation.

13. In a device of the class described, a switch rod, a stud projecting from said rod, a switch point clip having a circular aperture therein into which said stud extends, and a member having a circular periphery to engage the walls of said aperture and having a seat to engage said stud.

14. In a device of the class described, a switch rod, a stud projecting therefrom, a switch point clip having an aperture into which said stud extends, and a member adapted to fit in said aperture around said stud, said member having a flange overlying said switch point clip.

15. In a device of the class described, a switch rod, a switch point clip, one of said parts having a recess formed therein, the other of said parts having a stud projecting therefrom into said recess, an adjustment member fitting in said recess and having a seat to engage said stud, and means to hold said elements in assembled relation.

16. In a device of the class described, a switch rod, a switch point clip, one of said parts having a stud projecting therefrom, and an adjustment member having an eccentric seat to engage said stud, the other of said first-named parts being adapted to engage said adjustment member.

In testimony whereof, I have subscribed my name.

FRANK B. BRADLEY.

Witnesses:
GEO. L. WILLIAMSON,
GLEN E. SMITH.

Copies of this patent may be obtained for five cents each, by addressing the "Commissioner of Patents, Washington, D. C."